United States Patent
Rendino et al.

Patent Number: 5,453,120
Date of Patent: Sep. 26, 1995

[54] ERASABLE MARKING MATERIAL AND A METHOD FOR THE MANUFACTURE THEREOF

[75] Inventors: Paula Rendino, New York, N.Y.; William Grandmont, East Bridgewater, Mass.

[73] Assignee: Playstation Inc., New York, N.Y.

[21] Appl. No.: 170,712

[22] Filed: Dec. 21, 1993

[51] Int. Cl.⁶ .......................... C09D 13/00; C09D 11/12
[52] U.S. Cl. .................. 106/19 B; 106/19 A; 106/19 E; 106/20 A
[58] Field of Search .................. 401/49; 106/19 A, 106/19 B, 19 E, 20 A

[56] References Cited

U.S. PATENT DOCUMENTS

| | | | |
|---|---|---|---|
| 4,212,676 | 7/1980 | Ueda | 106/19 B |
| 4,256,494 | 3/1981 | Yamamoto et al. | 106/22 A |
| 4,617,058 | 10/1986 | Lee | 106/19 B |
| 5,116,533 | 5/1992 | Grandmont et al. | 106/19 B |

*Primary Examiner*—Helene Klemanski
*Attorney, Agent, or Firm*—Herbert L. Bello

[57] ABSTRACT

An erasable marking material with a wax-based vehicle having a substantially uniform suspension of filler particles and pigment particles and a method for its manufacture. The wax-based vehicle is composed of a base wax and at least one supplemental wax. The wax-based vehicle has an oil content of up to about 10 percent by weight. The wax-based vehicle and suspended filler particles exhibit anti-settling properties for the suspension of fluorescent particles. The pigment particles impart luminescent properties to the marker. When rubbed across a surface, the marker deposits the wax-based vehicle and fluorescent particles to producing an erasable luminescent mark.

22 Claims, 1 Drawing Sheet

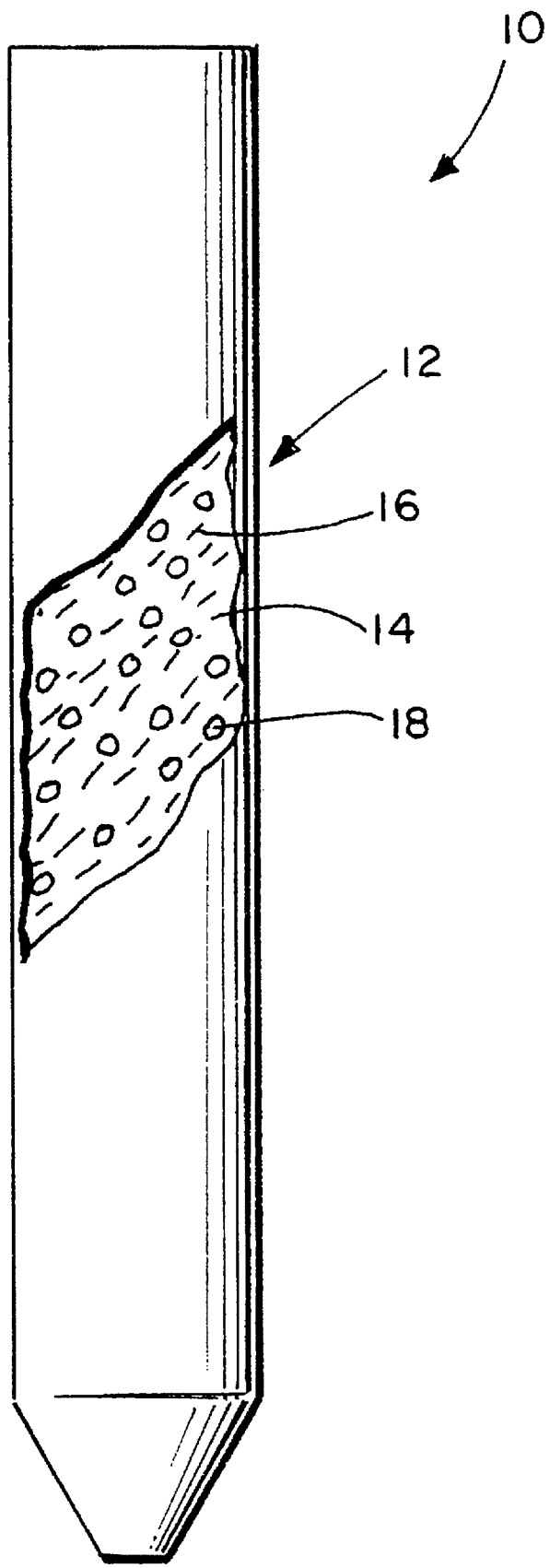

ERASABLE MARKING MATERIAL AND A METHOD FOR THE MANUFACTURE THEREOF

BACKGROUND OF THE INVENTION

1. Field of the Invention

The present invention relates to marking materials and, more particularly, is directed to fluorescent marking materials and a method for the manufacture thereof.

2. Description of the Prior Art

Marking crayons currently available on the market have met with limited success because they frequently exhibit less than favorable erasure characteristics. Such marking crayons are used for a variety of applications including children's toys. For example, erasable markers are used in back-lit bulletin boards. One of the disadvantages of currently available so-called erasable markers is that the marks produced by such markers frequently can not be erased without leaving a smeared surface which, in turn, makes viewing of subsequent writings difficult. As a result, users are often forced to clean-off an entire marked surface rather than amend only the relevant portions.

Attempts to produce high legibility markers having good erasure qualities have focused on the use of plasticizer or resin additives in conjunction with pigment materials. See U.S. Pat. Nos. 4,978,390 and 5,055,498. Also suggested have been formulations including, for example, vaseline and animal oils. See, e.g., U.S. Pat. Nos. 2,317,159 and 3,565,815. Unfortunately, however, none of these formulations produce a crayon having the requisite mechanical strength or desired erasure characteristics. More particularly, these formulations often produce crayons which are either overly soft or too brittle. Further, the marks they produce are effective only in the short-term due to rapid desiccation. Once the marks are desiccated, any attempt at erasure produces an unwanted, cloudy appearance on the writing surface.

A need has arisen for a marking material which exhibits improved writing and erasure characteristics.

SUMMARY OF THE INVENTION

It is an object of the present invention to provide a non-toxic and erasable marking material which does not suffer from the foregoing disadvantages and limitations.

It is another object of the present invention to provide an erasable marking material which can be used in a variety of applications including the marking of back-lit bulletin boards.

It is a further object of the invention to provide a method for the manufacture of a non-toxic, erasable marking material containing a substantially uniform suspension of macroscopic-sized fluorescent pigment particles.

The erasable marking material of the invention is characterized by a wax-base vehicle containing pigment particles. The marking material can also include filler particles which are at least partially transparent to visible and fluorescent light. If included, the filler particles can be up to 10 percent, preferably 5 percent, of the total weight of the marking material.

The wax-base vehicle typically has a relatively low oil content, i.e., up to about 10 percent by weight. More particularly, the oil content of the wax-based vehicle is in the range of between about 0.2 and 2.0 percent by weight, and, preferably, between about 0.2 and 0.5 percent by weight.

The pigment particles which are suspended in the wax-base vehicle generally comprise at least 20 percent by weight of the marking material. Preferably, however, the pigment particles are between about 20 and 50 percent of the total weight of the marking material. The pigment particles can be sized between about 0.5 and 30 microns. In the preferred embodiment of the invention, the pigment particles are composed of a fluorescent material.

The invention also contemplates a method of suspending pigment particles, e.g., fluorescent particles, in a wax medium to produce an erasable fluorescent marker. To commence the method of the invention, a wax blend is prepared. The wax blend typically includes a base wax and at least one supplemental wax. The oil content of the blend is selected so as to be in accordance with the parameters set forth above. Once the wax blend is melted, a filler material is added and mixed into the wax blend. The mixing continues until the resulting mixture is a uniform suspension of the filler material in the wax blend. To complete the process, the desired pigment particles are mixed into the wax/filler mixture using a high speed disperser so as to produce a final blend. Since the final blend is subsequently used for molding or extrusion, the introduction of the pigment particles into the wax/filler mixture is preferably conducted at a rate selected to avoid the formation of air bubbles. When mixing is complete, the final composition is characterized by a continuous non-settling suspension of the pigment particles in the wax/filler mixture. This material can then be extruded or molded as desired.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, the scope of the invention being indicated in the accompanying claims.

BRIEF DESCRIPTION OF THE DRAWINGS

A fuller understanding of the nature and objects of the present invention will become apparent upon consideration of the following detailed description taken in connection with the accompanying drawing in which there is shown a side view, partially cut-away, of a crayon embodying the invention.

DETAILED DESCRIPTION OF THE PREFERRED EMBODIMENTS

Referring now to the drawing there is illustrated an erasable marking material 10 in the form of a crayon 12. The marking material 10 includes a wax-based vehicle 14 having a substantially uniform and continuous suspension filler particles 16 and pigment particles 18.

The wax-base vehicle 14 is composed of a material that is characterized by superior erasure properties and suitable for molding or extrusion. In order to optimize legibility and erasure qualities, the wax-base vehicle 14 has a relatively low overall oil content. More particularly, the oil content of the wax-base vehicle 14 is up to about 10 percent by weight. Typically, the oil content of the wax-based vehicle 14 is in the range of between about 0.2 and 2.0 percent by weight, and, preferably, between about 0.2 and 0.5 percent by weight.

Preferably, the wax-base vehicle 14 is a mixture of wax compounds, e.g., a base wax and at least one supplemental wax. The base wax used in the production of the wax-based vehicle 14. preferably is a fully refined, white paraffin wax. This wax typically has an oil content in the range of no more than 7 percent by weight and a melting point of about 140 degrees Fahrenheit. It is preferred that the paraffin wax have an oil content of between 5 and 7 percent by weight. Paraffin wax is sold by many petroleum companies, a particularly useful paraffin wax is that sold under the trade name Mobilwax 140 by Mobil Oil Corporation. Other sources for paraffin waxes useful in the present invention include: Strahl & Pitsch, Inc. of West Babylon, N.Y.; Frank B. Ross Co. of Jersey City, N.J.; and Shell Oil Company. Mixing of at least one supplemental wax with the base wax, typically under heat at between about 175 to 200 degrees Fahrenheit, completes the wax-based vehicle 14. Typical supplemental waxes include Fischer Tropsche, carnauba, or paraflint wax. These supplemental waxes may be used individually or in combination. In addition to permitting fine adjustment of the oil content of the wax-base vehicle 14, these supplemental waxes impart a hardness not available from the base wax alone. As previously noted, the filler particles 16 are suspended in the wax-base vehicle 14.

The filler particles 16 can be up to 10 percent of the total weight of the marking material. Preferably, this material makes up about 5 percent of the marking material 10. In the preferred embodiment, the filler particles 16 are either silica particles or a micronized talcum power having particle sizes of up to about 20 microns. An exemplary talc material is sold under the trade name No. 1250 Micro Talc by the Charles B. Crystal Co., Inc. of New York, N.Y. These materials may also be used individually or in combination. Preferably, the particles 16 are at least partially transparent to fluorescent, as well as visible, light. As described in greater detail below, the filler particles 16 are suspended in the wax-based vehicle 14 using a disperser set at a speed selected to avoid the formation of air bubbles in the wax-based vehicle 14. The resulting wax-based vehicle/filler blend exhibits anti-settling properties which assist in the suspension of the pigment particles 18.

The pigment particles 18 typically have a particle size between about 0.5 and 30 microns. The pigment particles 18 typically are at least 20 percent by weight of the marking material 10 and, preferably, between about 20 and 50 percent by weight of the marking material 10. The pigment particles 18 are added to the mixture of wax-based vehicle 14 and filler particles 16 using a disperser set at a speed selected to avoid the formation of air bubbles. Although virtually any pigment material 18 can be used in the marking material 10, a fluorescent pigment is preferred. One fluorescent pigment that is particularly useful in connection with the present invention is FB series pigment sold by United Mineral and Chemical Corporation of Lyndhurst, N.J. Manufactures of other fluorescent pigments useful in connection with the present invention include: Day-Glo Color Corporation of Cleveland, Ohio; and Radiant Color of Richmond, Calif.

The invention also contemplates a method of suspending the pigment particles 18 in a wax medium. To commence the method of the invention, a wax-based vehicle 14 is prepared. In preparing the wax-based vehicle 14, the oil content is monitored so as to be in accordance with the parameters set forth above, namely, up to about 10 percent by weight, preferably in the range of 0.2 to 2.0 percent by weight, and specifically in the range of 0.2 to 0.5 percent by weight. A major portion of the wax-based vehicle 10, for example, paraffin wax, and a minor portion of one or more supplemental waxes, e.g., Fischer Tropsche or paraflint wax, are mixed under heat, typically 175 to 200 degrees Fahrenheit until a uniform mixture of the wax-based vehicle 14 is produced. Next, the filler material 16 is added to the wax-base vehicle 14. Mixing is performed under heat, generally at a minimum of 150 degrees Fahrenheit, using a disperser set at a medium speed. Mixing of the filler particles 16 into the wax-based vehicle 14 continues until a wax/filler mixture characterized by a uniform suspension of the filler particles 16 in the wax-based vehicle 14 results. To complete the procedure, the pigment particles 18 are mixed into the wax/filler mixture using a high speed disperser set at a medium speed. Mixing continues until the pigment particles 18 are suspended substantially continuously throughout the wax/filler mixture. The resulting final composition can then be extruded or molded as desired.

The following are an illustrative, non-limiting examples of the procedures embodying the invention for making an erasable marking material in the form of a marker or crayon.

EXAMPLE I

A wax-based vehicle was prepared by heating and melting 4 ounces of a paraffin wax, sold under the trade name Mobilwax 140 by Mobil Oil Corporation at 190 degrees Fahrenheit. Once the paraffin wax was fully liquified, 0.25 ounces of Fischer Tropsche wax was added. The combination of the two waxes was then heated again to 200 degrees Fahrenheit until fully liquified. Once the wax mixture was liquified and it had attained a constant temperature of approximately 200 degrees Fahrenheit, 12 more ounces of the paraffin wax were added. This mixture was again heated until fully liquified and then allowed to cool to between 150 and 160 degrees Fahrenheit. Next, 0.5 ounces of filler particles, specifically No. 1250 Micro Talc sold by the Charles B. Crystal Co., Inc. of New York, N.Y., was mixed into the wax blend using a disperser set at a speed sufficient to achieve a substantially uniform mixture and avoid the formation of air bubbles. Next, 8 ounces of pigment particles, namely, FB series pigment sold by United Mineral and Chemical Corporation of Lyndhurst, N.J. were added while the disperser continued to operate at a speed which would not foster the formation of air bubbles in the wax/filler blend. Throughout mixing the material was maintained at a temperature between 175 and 190 degrees Fahrenheit. The final marking mixture was poured into a mold having a cavity in the shape of a crayon and actively cooled. After cooling, the crayon was removed from the mold.

The crayon produced using the above-described procedure marked well on a variety of surfaces. The fluorescent particles imparted luminescent properties to markings made by the crayon. No significant deterioration of the markings was observed over a period of several days. The marks made by the crayon exhibited excellent erasure qualities.

EXAMPLE II

A wax-based vehicle was prepared in a beaker by melting together 46.75 grams of a paraffin wax having a melting point of 140 degrees Fahrenheit with 1.0 gram of Fischer-Tropsche wax and 16.25 grams of paraflint wax. The waxes were heated to between 170 and 190 degrees Fahrenheit until completely melted. Next, 2.0 grams of filler particles, specifically No. 1250 Micro Talc sold by the Charles B. Crystal Co., Inc. of New York, N.Y., was mixed into the wax blend using a disperser set at a speed sufficient to achieve a substantially uniform mixture and avoid the formation of air bubbles. Next, 32 grams pigment particles, namely, FB series pigment sold by United Mineral and Chemical Corporation of Lyndhurst, N.J. were added while the disperser continued to operate at a speed which would not foster the formation of air bubbles in the wax/filler blend. Throughout mixing the material was maintained at a temperature between 150 and 175 degrees Fahrenheit. The final marking mixture was poured into a mold having a cavity in the shape of a crayon and actively cooled. After cooling, the crayon was removed from the mold.

The crayon produced using the above-described procedure marked well on a variety of surfaces. The fluorescent particles imparted luminescent properties to markings made by the crayon. The marks made by the crayon exhibited good erasure qualities.

EXAMPLE III

A wax-based vehicle was prepared in a beaker by melting together 65.0 grams a paraffin wax having a melting point of 140 degrees Fahrenheit with 1.0 gram of Fisher-Tropsche wax. The waxes were heated to between 170 and 190 degrees Fahrenheit until completely melted. Next, 1.0 gram of filler particles, in particular silica particles, was mixed into the wax blend using a disperser set at a speed sufficient to achieve a substantially uniform mixture and avoid the formation of air bubbles. Next, 32 grams of pigment particles, namely, FB series pigment sold by United Mineral and Chemical Corporation of Lyndhurst, N.J. were added while the disperser continued to operate at a speed which would not foster the formation of air bubbles in the wax/filler blend. Throughout mixing the material was maintained at a temperature between 150 and 175 degrees Fahrenheit. The final marking mixture was poured into a mold having a cavity in the shape of a crayon and actively cooled. After cooling, the crayon was removed from the mold.

The crayon produced using the above-described procedure marked well on a variety of surfaces. The fluorescent particles imparted luminescent properties to markings made by the crayon. The marks made by the crayon exhibited good erasure qualities.

EXAMPLE IV

A wax-based vehicle was prepared in a beaker by melting together 65.0 grams a paraffin wax having a melting point of 140 degrees Fahrenheit with 1.0 gram of Fisher-Tropsche wax. The waxes were heated to between 170 and 190 degrees Fahrenheit until completely melted. Next, a mixture of filler particles including 1.0 gram of silica particles and 3.0 grams of talc particles, specifically No. 1250 Micro Talc sold by the Charles B. Crystal Co., Inc. of New York, N.Y., were mixed into the wax blend using a disperser set at a speed sufficient to achieve a substantially uniform mixture and avoid the formation of air bubbles. Next, 32 grams pigment particles, namely, FB series pigment sold by United Mineral and Chemical Corporation of Lyndhurst, N.J. were added while the disperser continued to operate at a speed which would not foster the formation of air bubbles in the wax/filler blend. Throughout mixing the material was maintained at a temperature between 150 and 175 degrees Fahrenheit. The final marking mixture was poured into a mold having a cavity in the shape of a crayon and actively cooled. After cooling, the crayon was removed from the mold.

The crayon produced using the above-described procedure marked well on a variety of surfaces. The fluorescent particles imparted luminescent properties to markings made by the crayon. The marks made by the crayon exhibited good erasure qualities.

EXAMPLE V

A wax-based vehicle was prepared by heating and melting 4 ounces of a paraffin wax, sold under the trade name Mobilwax 140 by Mobil Oil Corporation at 190 degrees Fahrenheit. Once the paraffin wax was fully liquified, 0.25 ounces of Fischer Tropsche wax was added. The combination of the two waxes was then heated again to 200 degrees Fahrenheit until fully liquified. Once the wax mixture was liquified and it had attained a constant temperature of approximately 200 degrees Fahrenheit, 12 more ounces of the paraffin wax were added. This mixture was again heated until fully liquified and then allowed to cool to between 150 and 160 degrees Fahrenheit. Next, 0.5 ounces of filler particles, specifically No. 1250 Micro Talc sold by the Charles B. Crystal Co., Inc. of New York, N.Y., was mixed into the wax blend using a disperser set at a speed sufficient to achieve a substantially uniform mixture and avoid the formation of air bubbles. Next, 0.0125 ounces of fluorescent dye sold by Pylam Products of Garden City, N.Y. were added while the disperser agitated the mixture without fostering the formation of air bubbles in the wax/filler blend. Next, 8 ounces of pigment particles, namely, FB series pigment sold by United Mineral and Chemical Corporation of Lyndhurst, N.J. were added while the disperser continued to operate at a speed which would not foster the formation of air bubbles in the wax/filler blend. Throughout mixing the material was maintained at a temperature between 175 and 190 degrees Fahrenheit. The final marking mixture was poured into a mold having a cavity in the shape of a crayon and actively cooled. After cooling, the crayon was removed from the mold.

The crayon produced using the above-described procedure marked well on a variety of surfaces. The fluorescent dye and particles imparted luminescent properties to markings made by the crayon. No significant deterioration of the markings was observed over a period of several days. The marks made by the crayon exhibited excellent erasure qualities.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. An erasable marking material comprising a wax-base vehicle and pigment particles, said wax-base vehicle having an oil content of about up to about 10 percent by weight, said pigment particles being substantially uniformly suspended in said wax-base vehicle.

2. The erasable marking material of claim 1 wherein said wax-base vehicle is a mixture of a base wax and a supplemental wax.

3. The erasable marking material of claim 2 wherein said base wax is a fully refined paraffin wax having an oil content which does not exceed 7 percent.

4. The erasable marking material of claim 2 wherein said supplemental wax is a wax selected from the group consisting of Fischer Tropsche, carnauba, and paraflint wax.

5. The erasable marking material of claim 1 wherein said oil content of said wax-based vehicle by percent of total weight of said wax-based vehicle is in the range of between about 0.2 and 2.0 percent.

6. The erasable marking material of claim 5 wherein said oil content of said wax-based vehicle by percent of total weight of said wax-based vehicle is in the range of between about 0.2 and 0.5 percent.

7. The erasable marking material of claim 1 wherein the quantity of said pigment particles by percent of total weight of the marking material is in the range of between about 20 and 50 percent.

8. The erasable marking material of claim 1 wherein the said pigment particles have a particle size in the range of between about 0.5 and 30 microns.

9. An erasable fluorescent marker comprising a substantially uniform mixture of a wax blend, fluorescent particles, and a filler, said wax blend having an oil content of up to about 10 percent, said fluorescent particles substantially uniformly suspended in said mixture, the quantity of said filler particles is up to about 10 percent by weight of said mixture, and the quantity of said fluorescent particles is at least 20 percent by weight of said mixture.

10. The erasable marker of claim 9 wherein said wax blend is a mixture of a base wax and a supplemental wax.

11. The erasable marker of claim 10 wherein said base wax is a fully refined paraffin wax having an oil content which does not exceed 7 percent.

12. The erasable marker of claim 11 wherein said supplemental wax is a wax selected from the group consisting of Fischer Tropsche, carnauba, and paraflint wax.

13. The erasable marker of claim 9 wherein said oil content of said wax blend by percent of total weight of said wax blend is in the range of between about 0.2 and 2.0 percent.

14. The erasable marker of claim 9 wherein the quantity of said fluorescent particles by total weight of the mixture is in the range of between about 20 and 50 percent.

15. A method of forming a final wax blend that is suitable for molding and extruding of an erasable marker, said method comprising the steps of:

(a) preparing a blend of waxes, said blend having an oil content of up to about 10 percent by weight;

(b) melting said wax blend;

(c) mixing a filler material with said wax blend to form a substantially uniform suspension of said filler material in said wax blend;

(d) mixing fluorescent pigment particles having a particle size between about 0.5 and 30 microns into said wax/filler mixture to form a final blend, said final blend being a substantially uniform, continuous, non-settling suspension of said fluorescent pigment particles in said mixture of said filler material and said wax blend, said final blend having up to about 10 percent by weight of said filler particles and at least 20 percent by weight of said fluorescent pigment particles.

16. The method of claim 15 wherein said step of preparing a blend of waxes includes the step of mixing a base wax and a supplemental wax.

17. The method of claim 16 wherein said wax is a paraffin wax and said supplemental wax is a wax selected from the group consisting of Fischer Tropsche, carnauba, and paraflint wax.

18. The method of claim 17 wherein said pigment particles are mixed into said wax/filler mixture at a rate selected to avoid the introduction of air into the final blend.

19. The method of claim 18 wherein said oil content of said wax blend by percent of total weight of said wax blend is up to about 7 percent.

20. The method of claim 19 wherein said oil content of said wax blend by percent of total weight of said wax blend is in the range of between about 1.5 and 2.0 percent.

21. An erasable marking material comprising a wax-base vehicle and fluorescent pigment particles, said wax-base vehicle having an oil content of about up to about 10 percent by weight, said fluorescent pigment particles being substantially uniformly suspended in said wax-base vehicle.

22. A method of suspending a fluorescent dye in a wax medium and forming a final wax blend that is suitable for molding and extrusion, said method comprising the steps of:

(a) preparing a blend of waxes, said blend having an oil content of up to about 10 percent by weight;

(b) melting said wax blend;

(c) mixing a filler material with said wax blend to form a substantially uniform suspension of said filler material in said wax blend;

(d) mixing a fluorescent dye into said wax/filler mixture to form a final blend, said final blend being a substantially uniform, continuous, non-settling suspension of said fluorescent dye in said mixture of said filler material and said wax blend, said final blend having up to about 10 percent by weight of said filler particles and at least 20 percent by weight of said fluorescent dye.

* * * * *